(12) United States Patent
Lee et al.

(10) Patent No.: US 10,301,407 B2
(45) Date of Patent: May 28, 2019

(54) VINYL CHLORIDE-BASED POLYMER AND METHOD FOR PREPARING THE SAME

(71) Applicant: LG CHEM, LTD., Seoul (KR)

(72) Inventors: Jung Rae Lee, Daejeon (KR); Kyung Seog Youk, Daejeon (KR); Heung Kwon Bae, Daejeon (KR); Hyun Min Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 15/545,617

(22) PCT Filed: Oct. 7, 2016

(86) PCT No.: PCT/KR2016/011274
§ 371 (c)(1),
(2) Date: Jul. 21, 2017

(87) PCT Pub. No.: WO2017/061829
PCT Pub. Date: Apr. 13, 2017

(65) Prior Publication Data
US 2018/0016371 A1    Jan. 18, 2018

(30) Foreign Application Priority Data

Oct. 7, 2015    (KR) .................. 10-2015-0141127

(51) Int. Cl.
*C08F 14/06*    (2006.01)
*C08F 130/08*    (2006.01)
(Continued)

(52) U.S. Cl.
CPC .............. *C08F 130/08* (2013.01); *C08F 2/00* (2013.01); *C08F 8/26* (2013.01); *C08F 8/42* (2013.01);
(Continued)

(58) Field of Classification Search
None
See application file for complete search history.

(56) References Cited

U.S. PATENT DOCUMENTS 2,564,291 A      8/1951  Wolf
3,808,173 A  *  4/1974  Orihashi .................. C08F 8/00
                                                          525/132

(Continued)

FOREIGN PATENT DOCUMENTS

DE      4124962 A1    1/1993
EP      0100741 A1    2/1984
(Continued)

OTHER PUBLICATIONS

Yang et al. "Structure and Thermal Properties of Exfoliated PVC/Layered Silicate Nanocomposites via in situ Polymerization" Journal of Thermal Analysis and Calorimetry, vol. 84, 2006, 2, 355-359. (Year: 2006).*

(Continued)

*Primary Examiner* — Robert S Loewe
(74) *Attorney, Agent, or Firm* — Dentons US LLP (57) ABSTRACT

The present invention relates to a vinyl chloride-based polymer which has improved thermal stability and a method for preparing the same. The vinyl chloride-based polymer includes silicate compound derived units, and a dehydrochloric acid (dehydrochlorination) reaction due to heat or ultraviolet rays may be suppressed, and thus, thermal stability may be improved, and discoloration and deformation of physical properties may be prevented. Accordingly, the vinyl chloride-based polymer and the method for preparing the same may be readily applied to industries requiring a vinyl chloride-based polymer, for example, industries related to a vinyl chloride-based resin and molded articles thereof.

7 Claims, 3 Drawing Sheets

(51) Int. Cl.
*C08F 2/00* (2006.01)
*C08F 8/26* (2006.01)
*C08F 8/42* (2006.01)
*C08F 292/00* (2006.01)
*C08K 3/34* (2006.01)

(52) U.S. Cl.
CPC ............ *C08F 14/06* (2013.01); *C08F 292/00* (2013.01); *C08K 3/34* (2013.01)

(56) References Cited

U.S. PATENT DOCUMENTS

| | | | | |
|---|---|---|---|---|
| 4,303,768 | A | * | 12/1981 | Blount .................... C04B 28/00 521/100 |
| 4,332,712 | A | * | 6/1982 | Blount ................. C08G 18/302 521/100 |
| 4,332,926 | A | * | 6/1982 | Blount ................... C08G 18/00 521/100 |
| 4,350,775 | A | * | 9/1982 | Blount ................. C08G 18/302 521/100 |
| 4,353,999 | A | * | 10/1982 | Blount ................. C08G 18/302 521/100 |
| 4,357,429 | A | * | 11/1982 | Blount ................. C08G 18/302 521/100 |
| 5,597,878 | A | | 1/1997 | Nakano et al. |
| 5,872,166 | A | | 2/1999 | Brilliant et al. |
| 2009/0312478 | A1 | * | 12/2009 | Hasegawa .............. H01B 3/443 524/444 |

FOREIGN PATENT DOCUMENTS

| | | | | |
|---|---|---|---|---|
| GB | 670197 | A | * 4/1952 | .............. C08F 14/06 |
| GB | 670197 | A | 4/1952 | |
| GB | 674080 | A | * 6/1952 | ............ C08F 283/00 |
| JP | 57-177040 | A | 10/1982 | |
| JP | 2005325330 | A | 11/2005 | |
| KR | 1020060039605 | A | 5/2006 | |
| KR | 1020080053686 | A | 6/2008 | |
| KR | 1020110006223 | A | 1/2011 | |
| KR | 101199094 | B | 11/2012 | |
| WO | 1997-000908 | A | 1/1997 | |

OTHER PUBLICATIONS

Shu et al. "Improving Mechanical Properties of Poly(vinyl chloride) by Doping with Organically Functionalized Reactive Nanosilica" J. Appl. Polym. Sci. 2013, 2931-3939. (Year: 2013).*

Gong et al. "Synthesis and characterization of PVC/montmorillonite nanocomposite" Journal of Materials Science, 2004, 39, 293-294. (Year: 2004).*

Zhao et al. "Polyhedral Oligomeric Silsesquioxane (POSS)-Modified Thermoplastic and Thermosetting Nanocomposites: A Review" Polymers & Polymer Composites, 2008, 16(8) 483-500. (Year: 2008).*

Soluble Silicates-Chemical, Toxicological, Ecological and Legal Aspects of Production, Transport, Handling and Application, CEES, Feb. 2013, pp. 1-19.

* cited by examiner

VINYL CHLORIDE-BASED POLYMER AND METHOD FOR PREPARING THE SAME

CROSS-REFERENCE TO RELATED APPLICATIONS

This application is a National Stage Application of International Application No. PCT/KR2016/011274, filed Oct. 7, 2016, and claims the benefit of priority based on Korean Patent Application No. 10-2015-0141127, filed on 7 Oct. 2015, the entire contents of which are incorporated herein by reference.

TECHNICAL FIELD

The present invention relates to a vinyl chloride-based polymer which has improved thermal stability, and a method for preparing the same.

BACKGROUND ART

A vinyl chloride-based polymer is a polymer including 50% or more of vinyl chloride, cheap and easy to control the hardness thereof, and applicable in most processing instruments, and thus, has various application fields. In addition, since molded articles having excellent physical and chemical properties, for example, mechanical strength, weather resistance, chemical resistance, etc. may be provided, the vinyl chloride-based polymer may be widely used in various fields.

However, due to chemical structural defects generated during a polymerization reaction, dehydrochlorination from the vinyl chloride-based polymer by heat or ultraviolet rays applied during processing may occur, and discoloration of a resin may be induced or the physical properties thereof may be deteriorated.

In particular, in a vinyl chloride-based polymer, chemical defects generated during a polymerization reaction, that is, chemical structural defects such as allyl chloride and tertiary chlorine may be present in the vinyl chloride polymer. Due to such chemical structural defects, the bonding energy between carbon and chlorine in the vinyl chloride-based polymer is very low than the bonding energy between carbon and chlorine in a normal molecular structure, bonding between carbon and chlorine may be easily cleaved due to external radical transition during the processing of the vinyl chloride-based polymer, and hydrogen chloride separated from a molecular chain may accelerate a new side reaction due to an auto-catalyst reaction, thereby continuously generating hydrogen chloride. In addition, a double bond may be formed at the position where the hydrogen chloride is left, and with the accumulation of such double bonds, problems of the discoloration or decrease of physical properties of a resin may be generated. That is, a dehydrochloric acid (dehydrochlorination) reaction is generated from a vinyl chloride-based polymer or a molded article processed therefrom due to heat or ultraviolet rays, and as a result, defects of discoloration or decrease of physical properties of the vinyl chloride-based polymer itself may occur.

In order to improve such defects of the vinyl chloride-based polymer, an organometallic compound containing a metal such as Ba, Zn, Ca and Pb is mixed with the vinyl chloride-based polymer, so as to suppress the generation of radicals or ions produced during thermal decomposition of the vinyl chloride-based polymer and to control the thermal decomposition rate of a resin. Recently, a method of using a thermal stabilizer having various types such as metallic types or organic compound types has been introduced, but due to environmental problems and high price caused by using a heavy metal stabilizer, the use thereof has been largely restricted.

In addition, a method of blending a polymer having good heat resistance with a vinyl chloride-based polymer to compensate weak physical properties has been suggested, but the use thereof is not easy because of difficult processing due to low miscibility with the vinyl chloride-based polymer.

Accordingly, development of a technique which is capable of effectively improving the thermal stability of a vinyl chloride-based polymer is required.

DISCLOSURE OF THE INVENTION

Technical Problem

The present invention has been devised in consideration of the above-mentioned problems, and the object of the present invention is to provide a vinyl chloride-based polymer which has improved thermal stability.

Another object of the present invention is to provide a method for preparing the vinyl chloride-based polymer.

Technical Solution

To solve the above-described tasks, the present invention provides a vinyl chloride-based polymer including vinyl chloride-based monomer derived units; and silicate compound derived units, wherein the silicate compound derived units are included in an amount of 0.1 parts by weight to 0.5 parts by weight on the basis of 100 parts by weight of the vinyl chloride-based monomer derived units.

In addition, the present invention provides a method for preparing the vinyl chloride-based polymer including adding a silicate compound precursor to a vinyl chloride-based monomer and polymerizing, wherein the silicate compound precursor is a compound represented by the following Formula 1, or a solution containing a compound represented by the following Formula 3:

$$M_2SiO_3 \quad \text{[Formula 1]}$$

$$SiO_2 \cdot nH_2O \quad \text{[Formula 3]}$$

In Formula 1 or 3,

M is Na, Li, K or $NH_4$ and n is a value for adjusting a valence depending on other components.

Advantageous Effects

A vinyl chloride-based polymer according to the present invention contains silicate compound derived units, and a dehydrochloric acid (dehydrochlorination) reaction due to heat or ultraviolet rays may be suppressed, and thus, the thermal stability may be improved, and the discoloration and the deformation of physical properties may be prevented.

In addition, in a preparation method according to the present invention, particles with uniform size may be formed, and the generation degree of scale is remarkably small. In addition, the plasticity of a silicate compound precursor may be increased without generating deformation of a vinyl chloride-based polymer, and the improving effect of thermal stability imparted therefrom may be maximized.

Therefore, the vinyl chloride-based polymer according to the present invention and the method for preparing the same may be easily applied to industries requiring the vinyl chloride-based polymer, for example, industries relevant to a vinyl chloride-based resin and molded articles.

BRIEF DESCRIPTION OF DRAWINGS

The accompanying drawings illustrate preferred embodiments of the present invention and are included together with the above description to provide a further understanding of the inventive concept. The inventive concept may, however, should not be construed as limited to the accompanying drawings.

BEST MODE FOR CARRYING OUT THE INVENTION

Hereinafter, the present invention will now be described in more detail in order to assist the understanding of the present invention.

It will be understood that words or terms used in the specification and claims shall not be interpreted as the meaning defined in commonly used dictionaries. It will be further understood that the words or terms should be interpreted as having a meaning that is consistent with their meaning in technical idea of the invention, based on the principle that an inventor may properly define the meaning of the words or terms to best explain the invention.

The present invention provides a vinyl chloride-based polymer which has excellent thermal stability and has low discoloration due to heat and ultraviolent rays.

The vinyl chloride-based polymer according to an embodiment of the present invention contains vinyl chloride-based monomer derived units and silicate compound derived units, where the silicate compound derived units are included in an amount of 0.1 parts by weight to 0.5 parts by weight on the basis of 100 parts by weight of the vinyl chloride-based monomer derived units.

The terms "derived unit" used in the present invention may mean a structure or a component generated by a certain material, or the certain material itself. For example, a vinyl chloride-based monomer derived unit may mean a structure or a component induced from a vinyl chloride-based monomer, or the vinyl chloride-based monomer itself.

The vinyl chloride-based monomer derived units may be derived from vinyl chloride-based monomers. In this case, the vinyl chloride-based monomers may mean pure vinyl chloride monomers, or a mixture of vinyl chloride monomers with vinyl-based monomers which are copolymerizable with the vinyl chloride monomers. That is, the vinyl chloride-based monomer derived units may include derived units by the copolymerization of the vinyl chloride monomers as a main material and vinyl-based monomers which are copolymerizable with the vinyl chloride monomers, as well as pure vinyl chloride monomer derived units. Here, if the vinyl chloride-based monomer derived units are derived from the copolymerization of the vinyl chloride monomers and the vinyl-based monomers, the units derived by the copolymerization may include the vinyl chloride in an amount of 50% or more.

Examples of vinyl-based monomers copolymerizable with the vinyl chloride-based monomers may include, but not limited to, olefin compounds such as ethylene, propylene and butane, vinyl esters such as vinyl acetate, vinyl propionate and vinyl stearate, unsaturated nitriles such as acrylonitrile, vinyl alkyl ethers such as vinyl methyl ether, vinyl ethyl ether, vinyl octyl ether and vinyl lauryl ether, vinylidene halides such as vinylidene chloride, unsaturated fatty acids and anhydrides of these fatty acids such as acrylic acid, methacrylic acid, itaconic acid, maleic acid, fumaric acid, maleic anhydride and itaconic anhydride, unsaturated fatty acid esters such as methyl acrylate, ethyl acrylate, monomethyl maleate, dimethyl maleate and butyl benzyl maleate, and crosslinkable monomers such as diallyl phthalate, and the above-mentioned vinyl-based monomers may be used alone or as a mixture of two or more thereof.

The silicate compound derived units according to an embodiment of the present invention may be derived from a silicate compound, and the silicate compound derived units may be combined with the vinyl chloride-based monomer derived units to play the role of improving the thermal stability of a vinyl chloride-based polymer.

In particular, the silicate compound derived unit may be bonded with one side of the vinyl chloride-based monomer derived unit via electrostatic attraction, for example, dipole-dipole interaction. The bond of the vinyl chloride-based monomer derived unit and the silicate compound derived unit via electrostatic attraction may change to a covalent bond by the application of heat, and thus, a dehydrochloric acid (dehydrochlorination) reaction which is generated by the application of heat may be suppressed. Accordingly, the thermal stability of the vinyl chloride-based polymer according to an embodiment of the present invention may be excellent.

The silicate compound may include a compound in which hydrogen in silicate is substituted with a metal atom, and particularly, the silicate compound may be a monomolecular water-soluble silicate or a non-crystalline water-soluble silicate.

The monomolecular water-soluble silicate may be a compound represented by the following Formula 1:

In Formula 1,

M may be Na, Li, K or $NH_4$.

The non-crystalline water-soluble silicate may be a compound represented by the following Formula 2:

In Formula 2,

X is Na, Li, K or Ca, and n is a value determined to adjust a valence depending on other components.

In particular, the non-crystalline water-soluble silicate may be a compound derived from non-crystalline silica gel, or a compound formed by ionizing silica gel by the following preparation method.

The vinyl chloride-based polymer according to an embodiment of the present invention may include, as described above, the silicate compound derived units in an amount of 0.1 parts by weight to 0.5 parts by weight with respect to 100 parts by weight of the vinyl chloride-based monomer derived units. If the silicate compound derived units are included in an amount of less than 0.1 parts by weight, the suppressing effect of a dehydrochloric acid (dehydrochlorination) reaction may be insignificant, and as a result, the improving effect of the thermal stability of the vinyl chloride-based polymer may be insignificant, and if the silicate compound derived units are included in an excessive amount of greater than 0.5 parts by weight, plastisol viscosity may increase during processing a vinyl chloride-based polymer including thereof, and the processability thereof may be deteriorated, and the surface characteristics of molded articles processed therefrom may not be good.

The term "plastisol" used herein means a mixture of a resin and a plasticizer so as to mold, cast, or mold in a continuous film phase by heating, and for example, may mean a paste phase obtained by mixing a vinyl chloride-based polymer and a plasticizer.

The vinyl chloride-based polymer according to the present invention includes the silicate compound derived units, and a dehydrochloric acid (dehydrochlorination) reaction which is generated when exposed to heat or ultraviolet rays, may be suppressed, and therefore, thermal stability may be markedly improved. Accordingly, the discoloration and deformation of the vinyl chloride-based polymer may be restrained.

In addition, there is provided in the present invention a method for preparing the vinyl chloride-based polymer having excellent thermal stability and a low degree of discoloration due to heat and ultraviolet rays.

The a method for preparing the vinyl chloride-based polymer according to an embodiment of the present invention is characterized in including a step (step A) of adding a silicate compound precursor to a vinyl chloride monomer and polymerizing, wherein the precursor is a compound represented by the following Formula 1, or an alkaline solution including a compound represented by the following Formula 3:

[Formula 1]

[Formula 3]

In Formula 1 or Formula 3,
M is Na, Li, K or $NH_4$, and
n is a value to adjust a valence depending on other components.

Step A is a step for preparing a vinyl chloride-based polymer including the above-described vinyl chloride-based monomer derived units and the silicate compound derived units by polymerizing vinyl chloride-based monomers in the presence of the silicate compound precursor.

The polymerization is not specifically limited, and an appropriate polymerization method may be conducted in accordance with the purpose, for example, emulsion polymerization such as micro-seed emulsion polymerization, microemulsion polymerization, and pure emulsion polymerization, suspension polymerization, or bulk polymerization, or may be conducted by appropriately combining the polymerization methods.

As an embodiment of the present invention, the polymerization may be conducted by adding a vinyl chloride-based monomer, a water-soluble polymerization initiator and a silicate compound precursor to a vacuum reactor filled with a first emulsifier, and performing a reaction, wherein the silicate compound precursor may be added with the vinyl chloride-based monomer prior to the initiation of polymerization, or added with a time lag from the vinyl chloride-based monomer so as to participate in the reaction. In addition, a second emulsifier may be additionally added during the polymerization, and in this case, the second emulsifier may be continuously added.

Here, the reactor filled with the first emulsifier may be a reactor including the first emulsifier, or may be further filled with an additive such as polymerizing water, a dispersant, a reaction inhibitor, an electrolyte, and a chain transfer agent in addition to the first emulsifier if needed. In this case, on the basis of 100 parts by weight of the vinyl chloride-based monomer, the first emulsifier may be used in an amount of 0.02 parts by weight to 0.4 parts by weight, the water soluble polymerization initiator may be used in an amount of 0.01 parts by weight to 2 parts by weight, the second emulsifier may be used in an amount of 0.01 parts by weight to 6 parts by weight, the polymerization water may be used in an amount of 70 parts by weight to 125 parts by weight, the electrolyte may be used in an amount of 0.0001 parts by weight to 3 parts by weight, and the chain transfer agent may be used in an amount of 0.01 parts by weight to 2 parts by weight.

The vinyl chloride-based monomer may be pure vinyl chloride monomer alone, or a combination of a vinyl chloride monomer and a vinyl-based monomer as described above, and the particular vinyl-based monomer may be the same as described above.

The silicate compound precursor may use different precursors in accordance with a target silicate compound derived unit.

In particular, the precursor may be a compound represented by the above Formula 1, and in this case, the precursor may be used in an amount of 0.1 parts by weight to 0.5 parts by weight on the basis of 100 parts by weight of the vinyl chloride-based monomer.

In addition, the precursor may be an alkaline solution containing a compound represented by the above Formula 3. If the precursor is an alkaline solution, the precursor may be added in an amount such that the compound represented by the above Formula 3 is added in an amount of 0.1 parts by weight to 0.5 parts by weight with respect to 100 parts by weight of the vinyl chloride-based monomer.

The compound represented by the above Formula 3 may be silica gel, and the above Formula 3 may represent an empirical formula of the silica gel.

The terms "empirical formula" used in the present invention mean the simplest chemical formula which represents the composition of atoms in a compound, and represent the type and number of atoms or ions constituting the compound by the simplest ratio of integers.

The alkaline solution may include a compound represented by the above Formula 3 and a strongly basic compound, that is, the alkaline solution may be a mixture solution of a compound represented by the above Formula 3 and a strongly basic compound. In this case, the alkaline solution may further include water if needed, and may include the compound represented by the above Formula 3 and the strongly basic compound in an equivalent ratio of 1:0.5 to 1:3, specifically, in an equivalent ratio of 1:1 to 1:2.

The strongly basic compound may be an alkali metal hydroxide and specifically be at least one selected from the group consisting of potassium hydroxide (KOH), sodium hydroxide (NaOH), lithium hydroxide (LiOH), and calcium hydroxide (Ca(OH)$_2$).

In the preparation method according to an embodiment of the present invention, silica gel with superhydrophobicity is not used by itself but used after mixing with a strongly basic compound to prepare an alkaline solution, and —H$^+$ in a —OH group which is present in the silica gel takes a substitution reaction with an alkali metal (—X$^+$) in the strongly basic compound so as to form a non-crystalline water-soluble silicate compound with which an alkali metal is combined, which may be readily dissolved in a solvent such as water. Accordingly, in the preparation method according to an embodiment of the present invention, in which a polymerization reaction is performed in an aqueous solution state, polymerization with a vinyl chloride-based monomer may be easily performed, and defects generated due to unplasticization of plastisol including the vinyl chloride-based polymer prepared therefrom during the processing, may be improved.

The first emulsifier and the second emulsifier may mean different types of materials, or just may mean addition order. Accordingly, the first emulsifier and the second emulsifier may be the same material or different materials. Each of the first emulsifier and the second emulsifier may be at least one selected from the group consisting of sodium lauryl sulfate, lauryl benzene sulfonic acid, alpha-olefin sulfonate, sodium lauryl ethoxylated sulfate, sodium octadecyl sulfate, sodium lauryl ether sulfate, and a linear alkylbenzene sulfonate.

The water-soluble polymerization initiator is not specifically limited, but may be at least one selected from the group consisting of potassium persulfate, ammonium persulfate, and hydrogen peroxide.

The chain transfer agent is not specifically limited but may be, for example, n-butyl mercaptan, n-octyl mercaptan, n-dodecyl mercaptan, t-dodecyl mercaptan, or the like.

The electrolyte is not specifically limited but may be, for example, at least one selected from the group consisting of potassium chloride, sodium chloride, potassium bicarbonate, sodium carbonate, potassium carbonate, potassium bisulfite, sodium bisulfite, tetrapotassium pyrophosphate, tetrasodium pyrophosphate, tripotassium phosphate, trisodium phosphate, dipotassium hydrogenphosphate, and disodium hydrogenphosphate.

The polymerization is not specifically limited, but may be performed in a temperature range of, for example, 30° C. to 70° C.

In addition, the preparation method according to an embodiment of the present invention may further include at least one step of dehydrating, washing and drying after step A.

Hereinafter, the present invention will be described in more detail, according to specific examples and experimental examples. However, the following examples and experimental examples are merely presented to exemplify the present invention, and the scope of the present invention is not limited thereto.

Example 1

180 kg of polymerization water, 30 g of sodium lauryl sulfate, 324 g of sodium hydroxide, and 405 g of monopotassium phosphate (KH$_2$PO$_4$) were added to a 500 L high pressure reactor, and the reactor was degassed while stirring. To the reactor in a vacuum state, 180 kg of a vinyl chloride monomer, 2.25 kg of potassium persulfate and 0.1 parts by weight (on the basis of 100 parts by weight of vinyl chloride monomer) of sodium metasilicate (Na$_2$SiO$_3$) were added, and the temperature of the reactor was elevated to 58° C. to initiate polymerization. After initiating the polymerization, 18 kg of sodium lauryl sulfate was continuously added to the reactor for 5 hours. Then, the reaction was terminated when the pressure of the reactor reached 4 kg/cm$^2$, and unreacted vinyl chloride monomer was recovered and removed. The product thus obtained was spray dried to obtain a vinyl chloride polymer in a particulate state.

Example 2

A vinyl chloride-based polymer in a particulate state was obtained by the same method described in Example 1 except for using 0.5 parts by weight of sodium metasilicate (Na$_2$SiO$_3$).

Example 3

A vinyl chloride-based polymer in a particulate state was produced by the same method described in Example 1 except for using an alkaline solution in which silica gel was dissolved in an amount of 0.1 parts by weight with respect to 100 parts by weight of a vinyl chloride monomer instead of metasilicate (Na$_2$SiO$_3$). In this case, the alkaline solution was prepared by mixing 180 g of silica gel, 120 g of sodium hydroxide and 2.4 kg of water.

Comparative Example 1

A vinyl chloride-based polymer in a particulate state was obtained by the same method described in Example 1 except for not using sodium metasilicate (Na$_2$SiO$_3$).

Comparative Example 2

A vinyl chloride-based polymer in a particulate state was obtained by the same method described in Example 1 except for using 0.1 parts by weight of silica gel instead of sodium metasilicate (Na$_2$SiO$_3$).

Comparative Example 3

A vinyl chloride-based polymer in a particulate state was obtained by the same method described in Example 1 except for using 0.05 parts by weight of sodium metasilicate (Na$_2$SiO$_3$).

Comparative Example 4

A vinyl chloride-based polymer in a particulate state was obtained by the same method described in Example 1 except for using 0.6 parts by weight of sodium metasilicate (Na$_2$SiO$_3$).

Experimental Example 1

In order to verify the amounts of silicate compound derived units in the vinyl chloride polymers of Examples 1 to 3, an EDS analysis was conducted. The results are shown in FIGS. 1 to 3.

In particular, 2 g of each vinyl chloride polymer was put in a crucible and fired in a firing kiln at 600° C. for 3 hours to obtain ash. Using the ash thus obtained, inorganic material analysis was conducted by using EDS (OXFORD INSTRUMENTS-INCA PentaFETx3).

Figure 1:
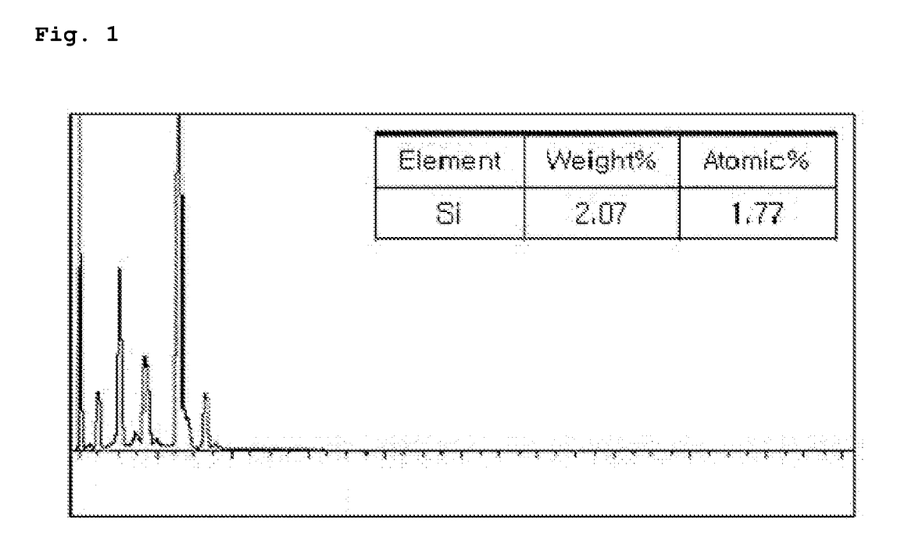
FIG. 1 illustrates analysis result of energy dispersive spectroscopy (EDS) on a vinyl chloride-based polymer of Example 1 according to an embodiment of the present invention.
Figure 2:
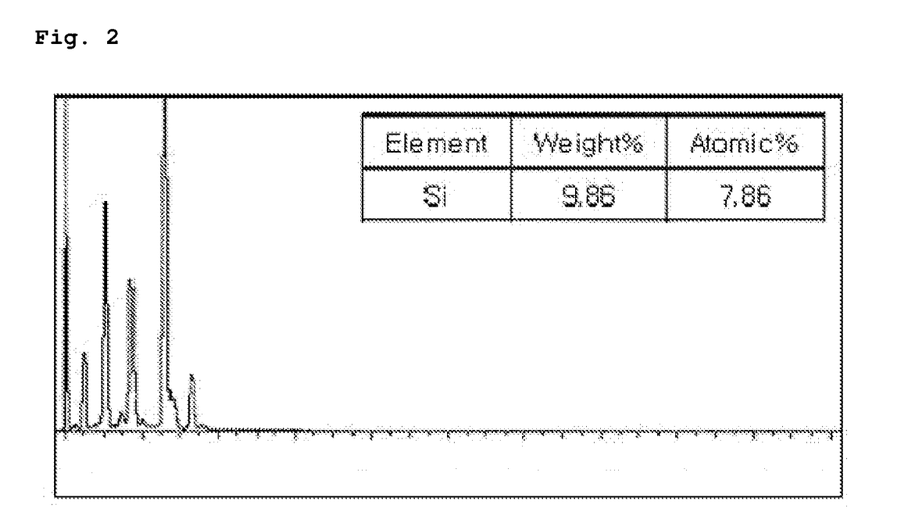
FIG. 2 illustrates analysis result of energy dispersive spectroscopy (EDS) on a vinyl chloride-based polymer of Example 2 according to an embodiment of the present invention.
Figure 3:
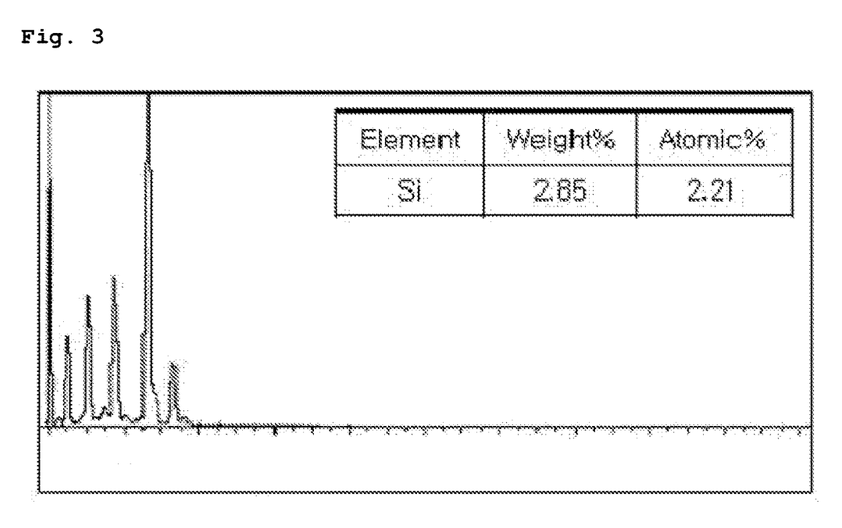
FIG. 3 illustrates analysis result of energy dispersive spectroscopy (EDS) on a vinyl chloride-based polymer of Example 3 according to an embodiment of the present invention.

As shown in FIGS. 1 to 3, it was confirmed that effective amounts of silicate compound derived units are present in the vinyl chloride polymers of Examples 1 to 3 according to example embodiments of the present invention.

Experimental Example 2

Plastisol including each of the vinyl chloride polymers of Examples 1 to 3 and Comparative Examples 1 to 4 was prepared, and the thermal stability of each vinyl chloride polymer was comparatively analyzed, wherein the thermal stability was analyzed by yellow index. In addition, the viscosity stability of each plastisol was comparatively analyzed for confirming processability.

First, 100 g of each vinyl chloride polymer and 120 g of dioctyl phthalate (DOP) were mixed by using a Werke mixer (Eurostar IKA) at 800 rpm for 10 minutes to prepare each plastisol.

In addition, 100 g of the vinyl chloride polymer of Comparative Example 1, 120 g of dioctyl phthalate (DOP), and 0.1 parts by weight of sodium metasilicate ($Na_2SiO_3$) (on the basis of 100 parts by weight of the vinyl chloride monomer used in Comparative Example 1) or the alkaline solution of Example 3 (in an amount such that an amount of silica gel became 0.1 parts by weight on the basis of 100 parts by weight of the vinyl chloride monomer used in Comparative Example 1) were mixed using a Werke mixer (Eurostar IKA) at 800 rpm for 10 minutes to prepare each plastisol. The plastisol prepared using the sodium metasilicate was designated by Comparative Example 1-1, and the plastisol prepared using the alkaline solution was designated by Comparative Example 1-2.

Initial viscosity (one hour after the preparation of plastisol) and time-dependent viscosity (24 hours after the preparation of plastisol) of each plastisol thus prepared were measured using a Brookfield viscometer. The results are shown in Table 1 below.

In addition, each plastisol thus prepared was applied on a releasing paper using a rod with 0.5 mm and dried at 150° C. for 45 seconds by using a Mathis oven to manufacture a pregelling sheet. The surface of each sheet thus manufactured was observed and gelling availability was checked, and the results are shown in Table 2 below. After that, heat of 205° C. was applied to each sheet, and changes according to the lapse of time of 1 minute, 2 minutes, 3 minutes, 4 minutes and 5 minutes were observed. In addition, by using a colorimeter, yellow index (Y.I.) at 5 minutes was measured. The results are shown in Table 1 below and FIG. 4, and the higher the yellow index value is, the worse the thermal stability is.

TABLE 1

| Division | Initial viscosity (cP) | Time-dependent viscosity (cP) | Gelling availability | Yellow index (Y.I) |
|---|---|---|---|---|
| Example 1 | 5880 | 7440 | ○ | 96.28 |
| Example 2 | 6660 | 8470 | ○ | 66.73 |
| Example 3 | 5910 | 7800 | ○ | 96.38 |
| Comparative Example 1 | 5610 | 7160 | ○ | 113.8 |
| Comparative Example 1-1 | — | — | X | 111.4 |
| Comparative Example 1-2 | — | — | X | 116.6 |
| Comparative Example 2 | 5590 | 7090 | X | 109.6 |
| Comparative Example 3 | 5720 | 7330 | ○ | 103.9 |
| Comparative Example 4 | 7050 | 9610 | ○ | 65.36 |

○: Good gelling availability (silicate compound was not observed on the surface of sheet)
X: Not good gelling availability (silicate compound was observed on the surface of sheet)

As shown in the above Table 1, it was confirmed that the difference between the initial viscosity and the time-dependent viscosity of the plastisols including the vinyl chloride polymers of Example 1 to Example 3 according to example embodiments of the present invention was smaller than that of the plastisols including each of the vinyl chloride polymers of Comparative Example 1 to Comparative Example 4. This means that the vinyl chloride polymers of Example 1 to Example 3 according to example embodiments of the present invention have better viscosity stability when compared to the vinyl chloride polymers of Comparative Example 1 to Comparative Example 4, and may have excellent processability.

Figure 4:
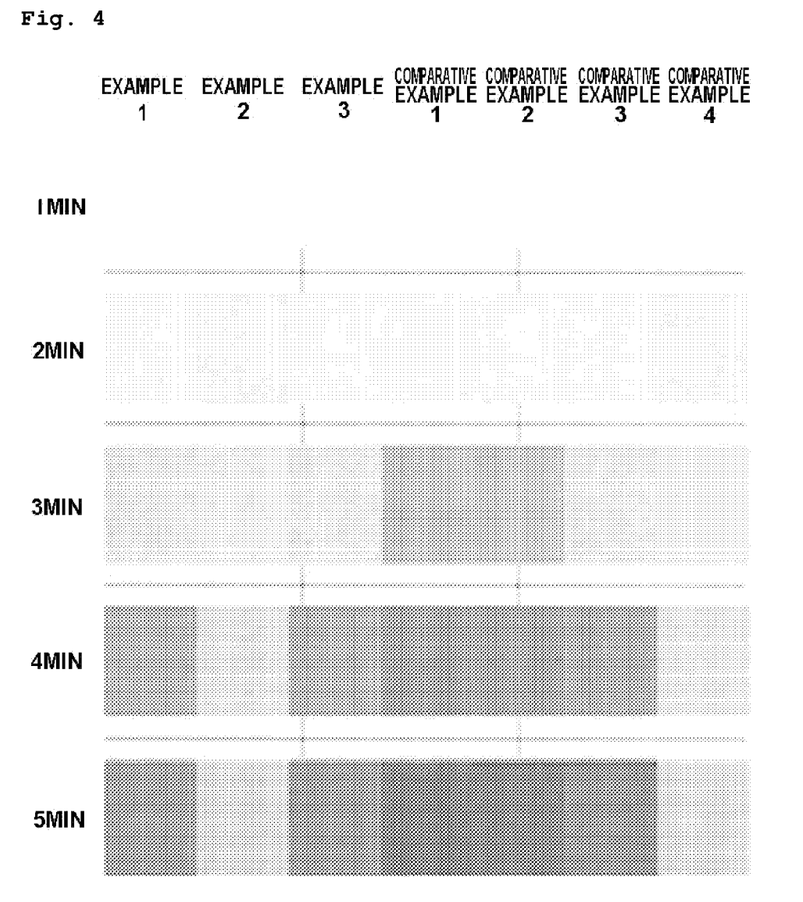
FIG. 4 illustrates observation results of color change on vinyl chloride polymer sheets of Examples 1 to 3 and Comparative Examples 1 to 4 in accordance with time to secure the thermal stability of polyvinyl chloride polymers according to example embodiments of the present invention.

In addition, as shown in Table 1 and FIG. 4, the vinyl chloride polymers of Example 1 to Example 3 according to example embodiments of the present invention had more favorable gelling availability and better thermal stability on the whole when compared to the vinyl chloride polymers of Comparative Example 1 to Comparative Example 4.

In particular, the yellow index of the vinyl chloride polymers of Example 1 to Example 3, which include silicate compound derived units, was secured to decrease by as much as about 59% to as few as about 84% when compared to the common yellow index of the conventional vinyl chloride polymer of Comparative Example 1. This result means that the vinyl chloride polymer including a silicate compound according to an embodiment of the present invention has markedly excellent thermal stability when compared to the conventional common vinyl chloride polymer which does not include the silicate compound.

In addition, when comparing each of the vinyl chloride polymer sheets of Comparative Example 1-1 and Comparative Example 1-2, which do not use a silicate compound as a component during preparing a vinyl chloride polymer, but as a component of plastisol, i.e., as a component of a processing composition, with the vinyl chloride polymer sheets of Example 1 to Example 3, the yellow index of the vinyl chloride polymer sheet of Comparative Example 1-1 was increased by about 16% when compared to the vinyl chloride polymer sheet of Example 1, and the yellow index of the vinyl chloride polymer sheet of Comparative Example 1-2 was increased by about 20% when compared to the vinyl chloride polymer sheet of Example 3. In addition, a residual silicate compound was not observed on the surface of the vinyl chloride polymer sheets of Example 1 and Example 3 according to example embodiments of the present invention, but a residual silicate compound was observed on the surface of the vinyl chloride polymer sheets of Comparative Example 1-1 and Comparative Example 1-2. This means that in the vinyl chloride polymer according to an embodiment of the present invention, a silicate compound undergoes a polymerization reaction together with a vinyl chloride monomer, and a structure in which silicate compound derived units are combined with vinyl chloride monomer derived units, and a dehydrochloric acid (dehydrochlorination) reaction generated by heat may be effectively suppressed, and thermal stability may be significantly improved (decrease of yellow index).

In addition, when comparing the vinyl chloride polymer sheet of Comparative Example 2 which uses silica gel by itself and the vinyl chloride polymer sheet of Example 3, silica gel was observed on the surface of the vinyl chloride polymer sheet of Comparative Example 2, and yellow index thereof was increased by about 14%. This indicates that when superhydrophobic silica gel is used, the silica gel cannot properly participate in a polymerization reaction, and thus, gelling is not available and thermal stability imparting effect is rarely found.

In addition, when respectively comparing the vinyl chloride polymer sheets of Example 1 and Example 2, with the vinyl chloride polymer sheets of Comparative Example 3 (using 0.05 parts by weight) and Comparative Example 4 (using 0.6 parts by weight), in which vinyl chloride polymers were prepared by the same preparation method as described in Example 1 using the same silicate compound but using a deviated amount of the silicate compound from the suggested amount of the present invention, the yellow index of the vinyl chloride polymer sheet of Comparative Example 3 was increased by about 8% in contrast to the vinyl chloride sheet of Example 1. This indicates that the improving effect of thermal stability is not much significant if the amount used of the silicate compound is smaller than the suggested amount range of the present invention.

Meanwhile, the vinyl chloride polymer sheet of Comparative Example 4 exhibited similar degree of yellow index as that of the vinyl chloride polymer sheet of Example 2, but the plastisol viscosity thereof was largely increased and the processability thereof was largely deteriorated. That is, the improving effect of the thermal stability in accordance with the increase of the silicate compound was rarely attained, but the viscosity properties of the plastisol was rather deteriorated, and thus, the processability thereof was considerably deteriorated.

The invention claimed is:

1. A vinyl chloride-based polymer comprising:
vinyl chloride-based monomer derived units; and
silicate compound derived units,
wherein an amount of the silicate compound derived units is from 0.1 parts by weight to 0.5 parts by weight on the basis of 100 parts by weight of the vinyl chloride-based monomer derived units,
wherein the silicate compound is a monomolecular water-soluble silicate or a non-crystalline water-soluble silicate, and
wherein the monomolecular water-soluble silicate is a sodium metasilicate.

2. The vinyl chloride-based polymer of claim 1,
wherein the non-crystalline water-soluble silicate is a non-crystalline silica gel combined with alkali metal, and
wherein the alkali metal is Na, Li, K or Ca.

3. A method for preparing the vinyl chloride-based polymer of claim 1, the method comprising:
adding a silicate compound precursor to a vinyl chloride-based monomer and polymerizing,
wherein the silicate compound precursor is a sodium metasilicate, or an alkaline solution containing a silica gel, and
wherein the sodium metasilicate or the silica gel is added in an amount of 0.1 parts by weight to 0.5 parts by weight on the basis of 100 parts by weight of the vinyl chloride-based monomer.

4. The method for preparing the vinyl chloride-based polymer of claim 3, wherein the alkaline solution comprises a strongly basic compound.

5. The method for preparing the vinyl chloride-based polymer of claim 4, wherein the alkaline solution comprises the silica gel and the strongly basic compound in an equivalent ratio of 1:0.5 to 3.

6. The method for preparing the vinyl chloride-based polymer of claim 4, wherein the strongly basic compound is at least one selected from the group consisting of potassium hydroxide, sodium hydroxide, lithium hydroxide and calcium hydroxide.

7. The method for preparing the vinyl chloride-based polymer of claim 3, wherein the polymerizing is performed in a temperature range of 30° C. to 70° C.

* * * * *